United States Patent
Baur et al.

(10) Patent No.: US 7,704,189 B2
(45) Date of Patent: Apr. 27, 2010

(54) STARTING METHOD FOR INTERNAL COMBUSTION ENGINES WITH A DOUBLE CLUTCH TRANSMISSION

(75) Inventors: Peter Baur, Moensheim (DE); Joachim Esser, Rutesheim (DE); Christian Hauck, Ludwigsburg (DE); Dieter Kraxner, Wurmberg (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 338 days.

(21) Appl. No.: 11/799,063

(22) Filed: Apr. 30, 2007

(65) Prior Publication Data

US 2007/0254773 A1    Nov. 1, 2007

(30) Foreign Application Priority Data

Apr. 29, 2006   (DE) ..................... 10 2006 020 064

(51) Int. Cl.
*B60W 10/02*   (2006.01)
(52) U.S. Cl. ...................... 477/180; 477/115; 74/335
(58) Field of Classification Search .................. None
See application file for complete search history.

(56) References Cited

U.S. PATENT DOCUMENTS

| | | | | |
|---|---|---|---|---|
| 5,407,401 A | * | 4/1995 | Bullmer et al. | 477/110 |
| 6,286,381 B1 | * | 9/2001 | Reed et al. | 74/336 R |
| 6,819,997 B2 | * | 11/2004 | Buchanan et al. | 701/67 |
| 6,949,051 B2 | * | 9/2005 | Katakura | 477/175 |
| 7,263,907 B2 | * | 9/2007 | Stevenson | 74/340 |
| 2004/0166991 A1 | * | 8/2004 | Buchanan et al. | 477/174 |
| 2006/0016282 A1 | | 1/2006 | Berger et al. | |
| 2006/0236798 A1 | | 10/2006 | Krauss et al. | |

FOREIGN PATENT DOCUMENTS

| | | |
|---|---|---|
| DE | 199 39 334 A1 | 3/2001 |
| DE | 100 04 179 A1 | 4/2001 |
| DE | 101 60 308 A1 | 7/2002 |
| DE | 102 32 229 A1 | 2/2004 |
| DE | 102 32 832 A1 | 2/2004 |
| EP | 1 298 341 A2 | 4/2003 |
| EP | 1 507 092 A1 | 2/2005 |
| WO | 03/074894 A2 | 9/2003 |
| WO | 03/074894 A3 | 9/2003 |
| WO | 2004/010019 A1 | 1/2004 |
| WO | 2004/033246 A2 | 4/2004 |

\* cited by examiner

*Primary Examiner*—Roger L Pang
*Assistant Examiner*—Justin Holmes

(57) ABSTRACT

A method implements a starting process for an internal combustion engine which has a drive unit and a transmission with at least two transmission input shafts and a multiple clutch device, in particular a double clutch device. During the starting process, the first gear is engaged in a first clutch of the multiple clutch device and is activated, while the second gear speed is engaged in a second clutch of the multiple clutch device but not activated. During the starting process, a current velocity is compared with a predefinable reference velocity, and when the reference velocity is reached a control unit causes the first clutch to be opened and thus causes the first gear to be deactivated while, in parallel with this, the second clutch is closed and the second gear is thus activated.

7 Claims, 3 Drawing Sheets

STARTING METHOD FOR INTERNAL COMBUSTION ENGINES WITH A DOUBLE CLUTCH TRANSMISSION

CROSS-REFERENCE TO RELATED APPLICATION

This application claims the priority, under 35 U.S.C. § 119, of German application DE 10 2006 020 064.0, filed Apr. 29, 2006; the prior application is herewith incorporated by reference in its entirety.

BACKGROUND OF THE INVENTION

Field of the Invention

The present invention relates to an internal combustion engine having a motor vehicle drive train which has a drive unit, a transmission with at least two transmission input shafts and a multiple clutch device, preferably a double clutch device. A first clutch configuration is assigned to a first transmission input shaft and a second clutch configuration is assigned to a second transmission input shaft, for transmitting a torque between the drive unit and the output unit, in this case a carden shaft, which transmits the force to the running gear.

Internal combustion engines with double clutch transmissions are already known, for example, from published, non-prosecuted German patent application DE 100 04 179 A1 and published, European patent application EP 1 298 341 A2.

SUMMARY OF THE INVENTION

It is accordingly an object of the invention to provide a starting method for internal combustion engines with a double clutch transmission which overcomes the above-mentioned disadvantages of the prior art methods of this general type.

With the foregoing and other objects in view there is provided, in accordance with the invention, a method for carrying out a starting process for a vehicle containing an internal combustion engine having a drive unit and a transmission with at least two transmission input shafts and one multiple clutch device. The method includes engaging and activating a first gear with a first clutch of the multiple clutch device if a starting process is detected, engaging but not activating a second gear with a second clutch device of the multiple clutch device and during the starting process, continuously comparing a reference value with a predefinable reference variable. A control device causes the first clutch to open and thus causes the first gear to be deactivated when the predefinable reference variable is reached and, in parallel, closes the second clutch and the second gear is thus activated, and a torque acting on the internal combustion engine is produced from a sum of torques of the first and second clutches acting on the internal combustion engine, and being approximately constant during a shifting process and is less than or equal to a current engine torque.

Drive trains with double clutch devices and power shift transmissions have the advantage that they ensure a high level of driving comfort with corresponding automation of the shifting processes.

The starting method according to the invention with two clutches which are controlled in such a way that at least one clutch is always closed, that is to say is activated, provides the advantage that the driving comfort is increased even further. At the same time both sporty and comfortable starting are made possible by virtue of the specific type of gear change from the relatively high transmission ratio in the first gear to the relatively low transmission ratio in the second gear. The model here is the starting behavior of a hydrodynamic torque converter, the starting process according to the invention having, compared to the torque converter, the advantage that a very flexible starting behavior from very comfortable to very sporty starting is possible by virtue of the variable actuation of the two clutches together with a very short transmission ratio of the first gear.

During the entire starting process a harmonic profile of the tractive force is given when shifting from the first gear into the second gear, as a result of which dips in the tractive force as a result of the shifting process from the first gear into the second gear are avoided, which also reduces the mechanical wear of the components.

Other features which are considered as characteristic for the invention are set forth in the appended claims.

Although the invention is illustrated and described herein as embodied in a starting method for internal combustion engines with a double clutch transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 2:
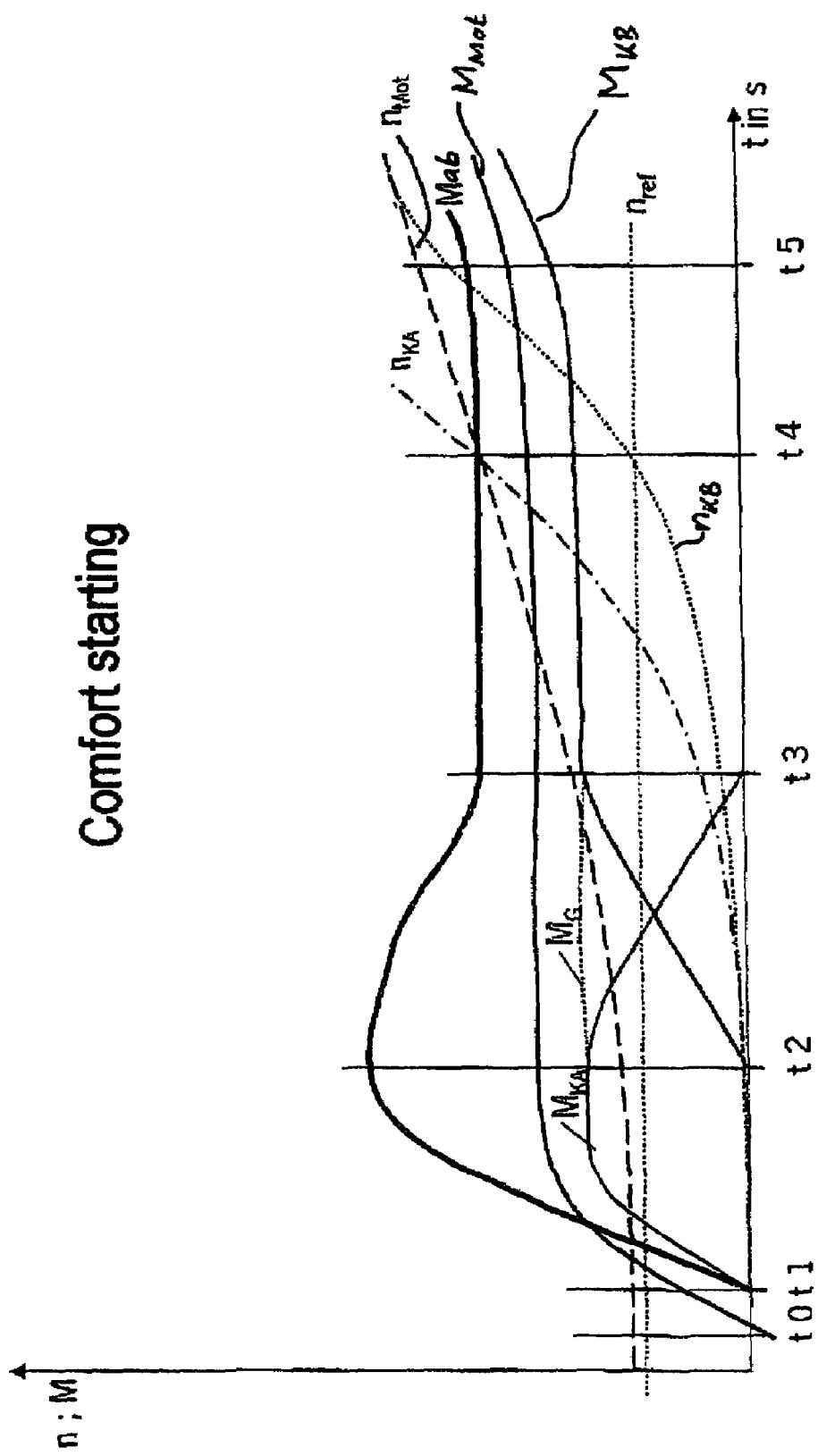
FIG. 2 is a graph showing a torque and rotational speed profile during a starting process for comfort starting.
Figure 3:
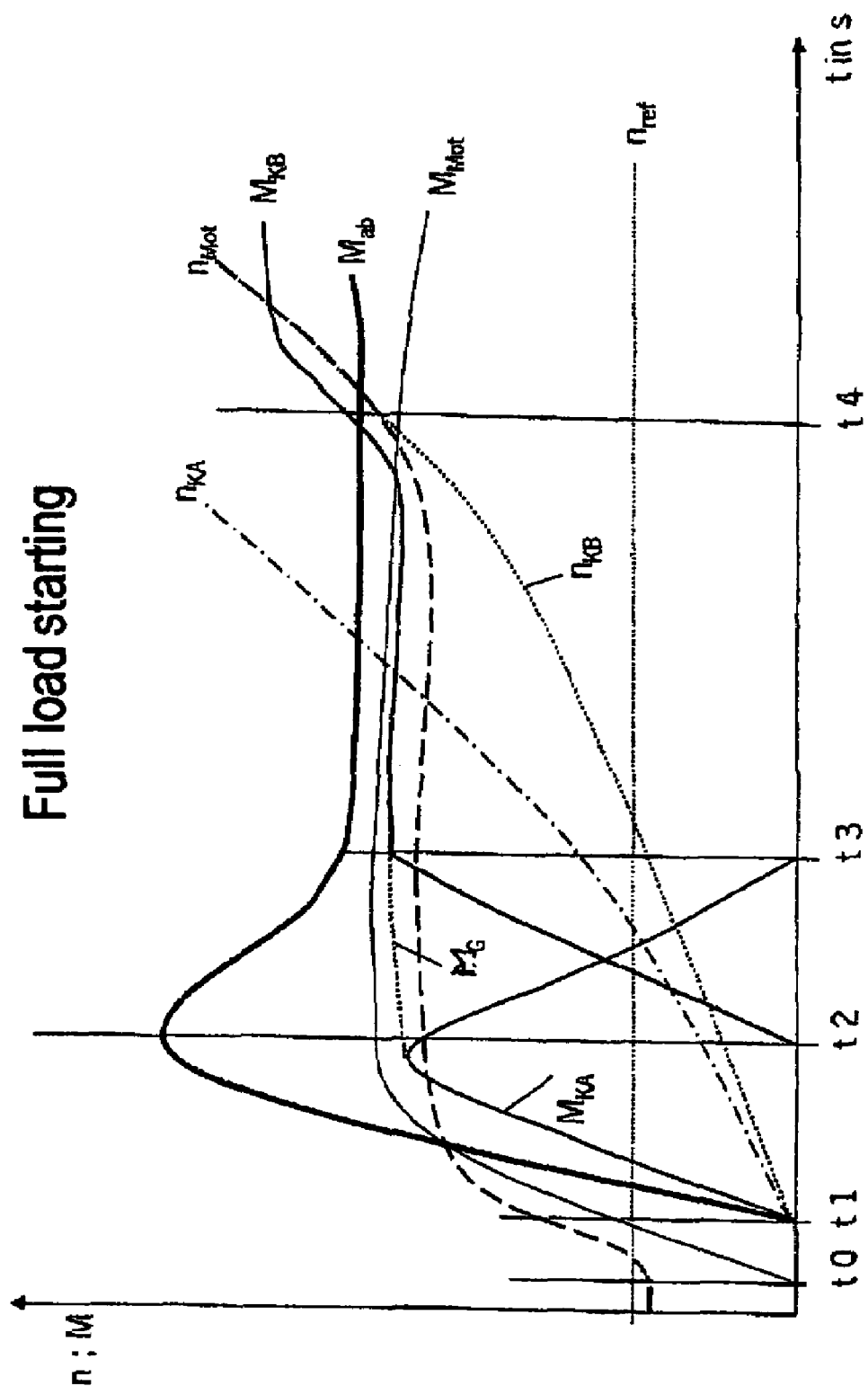
FIG. 3 is a graph showing the torque and rotational speed profile during the starting process for full load starting.

Referring now to the figures of the drawing in detail and first, particularly, to FIGS. 2 and 3 thereof, there are shown torque and rotational speed profiles plotted over time and use identical reference symbols for identical curve profiles. FIG. 2 illustrates a comfort starting mode and FIG. 3 illustrates a full load starting mode.

The following curve profiles are illustrated:

| | | |
|---|---|---|
| a. $n_{KA}$ | | rotational speed at first clutch KA; |
| b. $n_{KB}$ | | rotational speed at second clutch KB; |
| c. $n_{Mot}$ | | engine speed; |
| d. $n_{ref}$ | | reference speed; |
| e. $M_{KA}$ | | torque of first clutch KA; |
| f. $M_{KB}$ | | torque of second clutch KB; |
| g. $M_{mot}$ | | engine torque; |
| h. $M_{ab}$ | | output torque; and |
| i. $M_G$ | | overall torque of drive train. |

Figure 1:
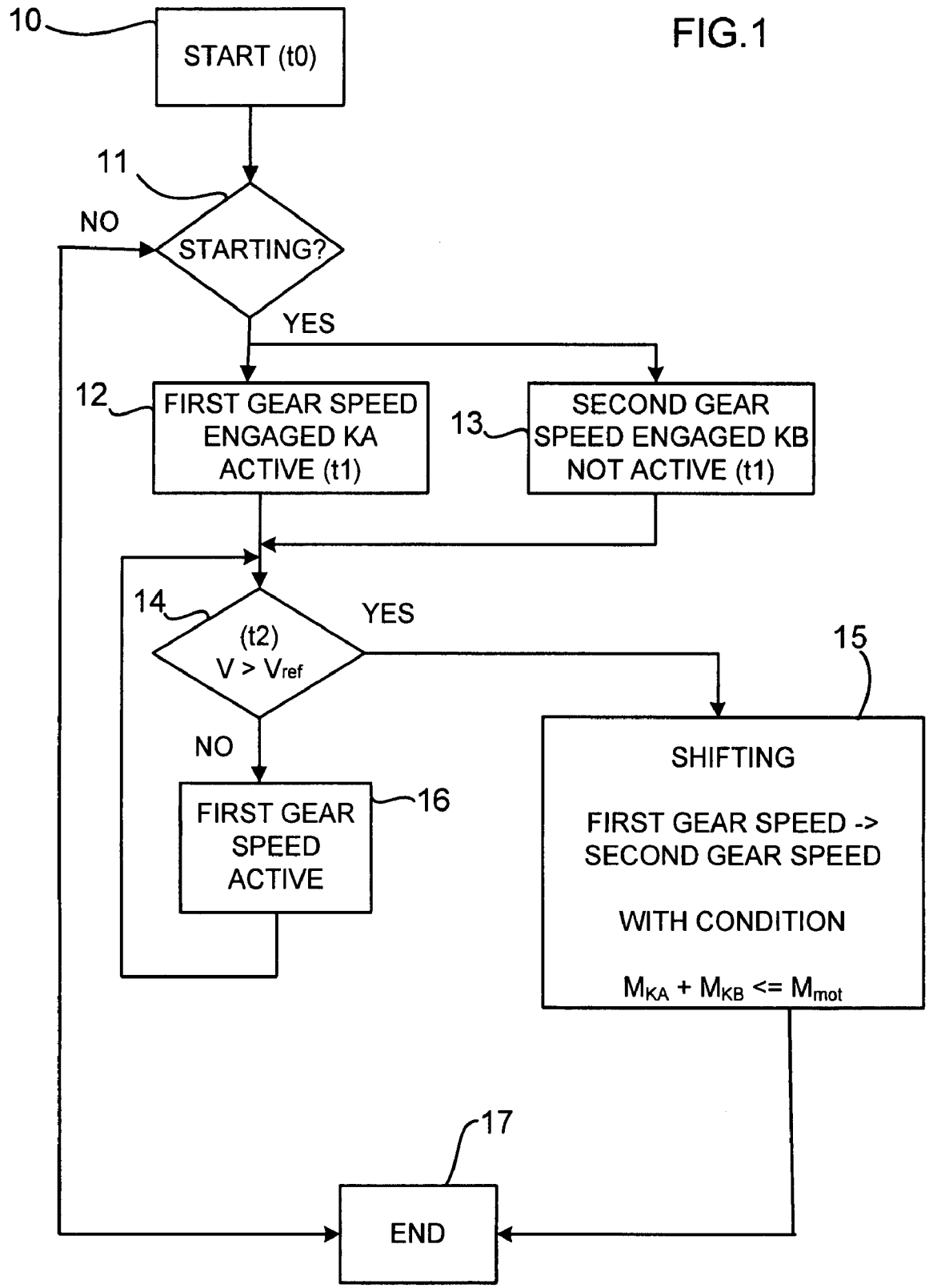
FIG. 1 is a flow chart showing individual method steps of a method according to the invention.

FIG. 1 illustrates a flowchart of the method in which the various operating parameters such as, for example, the rotational speed $n_{mot}$, a throttle valve angle, the engine torque $M_{Mot}$, the load L and the pressure p are first fed to the transmission control device at a time t0 in a method step 10 at the beginning of the starting process. These operating parameters are generally sensed by non-illustrated sensors which are already present and are thus available in the internal combustion engine so that they only have to be fed to the transmission control device via, for example, a corresponding bus system.

In the following operating step 11, it is checked whether a starting process has started. This is done, for example, with the ignition switched on, a velocity of the vehicle of 0 km/h and the accelerator pedal actuated.

At the start of the starting process at a time t1, the first gear is engaged in the operating step 12 in a first clutch KA and activated by closing the first clutch KA. The torque of the engine $M_{Mot}$ is thus transmitted via the torque of the clutch $M_{KA}$ to the drive shaft as an output torque $M_{ab}$ for the starting process, in which case for a high starting torque the starting transmission ratio is to be made very high. In order to utilize the maximum tractive force and minimize the loading of the clutch, starting is always performed in the first gear. The rotational speed of the engine $M_{Mot}$ first increases with the velocity during starting.

As illustrated in FIGS. 2 and 3, with the closing of the clutch KA and increasing torque $M_{KA}$ the curve $M_{ab}$ starts to rise at the time t1, the curve $M_{ab}$ the torque which is transmitted to the wheels for the starting process. As a result force is transmitted for the starting process to the running gear.

As shown by FIG. 1 and can be seen in the illustrations in FIGS. 2 and 3, the second gear is already engaged clearly before the actual shifting rotational speed is reached or already simultaneously with the engagement of the first gear in the operating step 13 in the second component transmission. The illustration of comfort starting in FIG. 2 shows that at first no torque is transmitted by the second clutch KB so that the curve $M_{KB}$ is approximately zero up to the time t2. The difference from full load starting in FIG. 3 will be explained later.

Therefore when the first gear is activated in the first clutch KA, the second gear is engaged in the second clutch KB, but the second gear is not activated, as illustrated in the operating steps 12 and 13 and in FIGS. 2 and 3 with the section t1 to t2.

During the starting process, the velocity v is compared with a predefinable reference velocity $v_{ref}$. This is illustrated in the flowchart in FIG. 1 by the method step 14. If the current velocity v exceeds the predefinable reference value $v_{ref}$ the shifting from the first gear into the second gear takes place in the downstream method step 15. In FIGS. 2 and 3, the condition is met at the time t2 and the shifting process starts at t2.

FIG. 2 shows that even while the first clutch KA is being opened and the first gear is deactivated, and in parallel with this the second clutch KB closes and the second gear is activated. The torque $M_{KA}$ which is transmitted via the first gear is reduced here simultaneously to the same degree as the torque $M_{KB}$ of the second gear increases. During the shifting process, the torque $M_{Mot}$ to be applied by the engine has to be above the overall torque of both clutches $M_G$ taken up by the clutches, so that the engine speed $n_{Mot}$ is not reduced. The maximum transmission output torque is achieved here by the transmission ratio of the engine torque in the first gear and not by a reduction of the engine speed when the second gear is engaged. The gear change takes place here at a longer time interval than that of customary shifting processes and the gear change is essentially unnoticeable to the driver. In FIGS. 2 and 3 the gear change is terminated at the time t3.

If it is determined in the interrogation at step 14 in FIG. 1 that the current velocity v is lower than the reference velocity $v_{ref}$ the method step 14 leads to the method step 16, and the first gear remains activated and the first clutch KA is not yet opened.

After the shifting process in method step 15, this mode of the starting process is exited, as is illustrated with step 17.

The diagrams in FIGS. 2 and 3 show that the engine speed $n_{Mot}$ rises monotonously during the entire starting process.

The rotational speed $n_{KA}$ of the first clutches KA and the rotational speed $n_{KB}$ of the second clutch KB rise with staggered timing.

The method according to the invention has the advantage that during the starting process the maximum force of the first gear speed is available at first, thus ensuring a high wheel torque. The stepless transition from the first gear to the second gear is comparable to the behavior of a converter with the torque increase which it can carry out.

The frictional efficiency at the clutch when starting is kept low by the utilization of the high starting transmission ratio. This is beneficial in particular for heavy vehicles.

The difference between comfort starting according to FIG. 2 and full load starting according to FIG. 3 becomes clear if the curve $M_{ab}$ for the output torque is considered. This curve rises significantly more strongly so that the force and transmission of torque takes place much more quickly here. The entire processes for shifting from the first gear to the second gear are implemented at relatively short time intervals.

The invention claimed is:

1. A method for carrying out a starting process for a vehicle containing an internal combustion engine having a drive unit and a transmission with at least two transmission input shafts and one multiple clutch device, which comprises the steps of:
    engaging and activating a first gear with a first clutch of the multiple clutch device if a starting process is detected;
    engaging but not activating a second gear with a second clutch device of the multiple clutch device;
    during the starting process, continuously comparing a reference value with a predefinable reference variable; and
    causing, via a control device, the first clutch to open and thus causing the first gear to become deactivated when the predefinable reference variable is reached and, in parallel, causing the second clutch and thus causing the second gear to become activated so that an overall torque of the clutches defined by a sum of torques of the first clutch and the second clutch acting on the internal combustion engine is approximately constant during a shifting process and is less than or equal to a current engine torque.

2. The method according to claim 1, which further comprises setting a velocity to be the predefinable reference variable.

3. The method according to claim 1, which further comprises detecting the starting process if at least an ignition is switched on and a velocity of the vehicle is substantially 0 Km/h.

4. The method according to claim 1, which further comprises:
    setting a predefinable velocity as the predefinable reference variable; and
    determining the predefinable velocity in dependence on engine speed profiles of the internal combustion engine and the multiple clutch device.

5. The method according to claim 1, wherein an engine speed rises monotonously during an entire time of the starting process.

6. The method according to claim 1, which further comprises:
    using a current velocity as the reference value; and
    using a reference velocity as the predefinable reference variable.

7. The method according to claim 1, which further comprises operating the multiple clutch device as a double clutch device.

* * * * *